Figure 1:
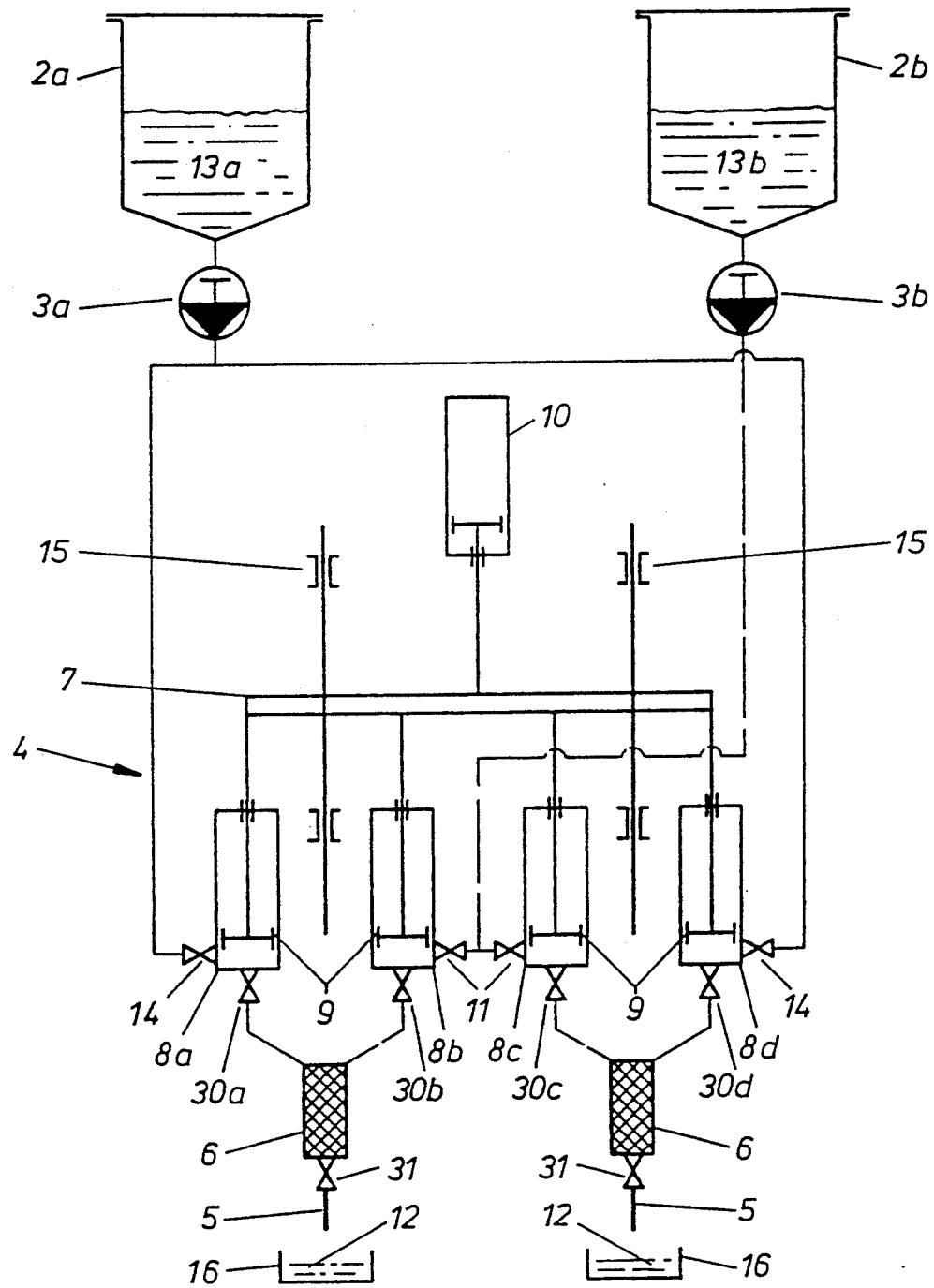

United States Patent [19]

Neff et al.

[11] Patent Number: 5,217,146
[45] Date of Patent: Jun. 8, 1993

[54] DEVICE FOR FILLING ONE OR MORE MOLDS WITH FLOWABLE MATERIALS

[75] Inventors: Gerd Neff, Sinn-Fleisbach; Erhard Haeuser, Schoeffengrund, both of Fed. Rep. of Germany

[73] Assignee: Wilhelm Hedrich Vakumanlagen GmbH & Co. KG, Ehringshausen-Katzenfurt, Fed. Rep. of Germany

[21] Appl. No.: 854,721

[22] Filed: Mar. 23, 1992

[30] Foreign Application Priority Data

Apr. 3, 1991 [DE] Fed. Rep. of Germany ... 9103989[U]

[51] Int. Cl.$^5$ .............................................. B67D 5/52
[52] U.S. Cl. ...................................... 222/137; 222/276
[58] Field of Search ................. 222/55, 135, 137, 255, 222/265, 270, 276, 280, 309, 318, 409; 264/328.6; 417/521, 489

[56] References Cited

U.S. PATENT DOCUMENTS

| | | | |
|---|---|---|---|
| 3,773,300 | 11/1973 | Hauser | 222/135 |
| 4,108,335 | 8/1978 | Hoff et al. | 222/137 |
| 4,307,760 | 12/1981 | Hauser | 222/55 |
| 4,741,623 | 5/1988 | Hauser et al. | 222/318 |

FOREIGN PATENT DOCUMENTS 3740857 6/1989 Fed. Rep. of Germany ...... 222/137

*Primary Examiner*—Andres Kashnikow
*Assistant Examiner*—Philippe Derskshani
*Attorney, Agent, or Firm*—Flynn, Thiel, Boutell & Tanis

[57] ABSTRACT

It is often necessary to manufacture casting masses out of several components which must be homogeneously mixed in a specific ratio. It can thereby happen that such casting masses harden so quickly that they must be processed in the shortest time possible in order not to react with one another or harden already in the mixing area or in the pipelines and thus result in the possible destruction of the device. The components are in the arrangement of the invention each moved by a pump out of the respective storage tanks into a synchronous dosing mechanism which consists of a dosing chamber for each component, from where the respective now dosed amount of each component is moved with the help of a dosing piston into a flow mixer, with the dosing pistons being thereby mechanically connected and operated by a common drive, and the flow mixer moving the now ready casting mass directly into a mold. The mixing ratios can in this manner be well maintained. The components can be dosed exactly, and a very continuous mixing in the mixer takes place. Furthermore, the amount of the volumes in excess of the needed casting volume is very low. The device can easily be adapted to different mixing ratios by suitable shutoff mechanisms.

14 Claims, 4 Drawing Sheets

DEVICE FOR FILLING ONE OR MORE MOLDS WITH FLOWABLE MATERIALS

It is known to have flowable and, if necessary, degassed materials for a casting resin preparation ready in individual storage tanks and to mix these materials prior to moving them into a specific mold. DE-OS 27 48 982 describes that the individual components from the storage tanks can also be moved by means of synchronously driven pumps at timed sequences through a mixer directly into the molds. Finally devices are also known in which the components are fed to a flow mixer by means of component dosing pumps, and the casting mass is thereafter cast parallel by means of dosing mechanisms.

Quickly hardening casting masses must be processed as quickly as possible so that they do not react or jell in the mixing and pipeline area, which can result in the breakdown of the entire device.

The basic purpose of the invention is to provide a device for filling one or more molds with flowable materials, with which quickly hardening casting masses can be readied, the individual components of which are prepared with mixing ratios which are to be precisely maintained. The casting mass volume in the mixing and pipeline area is thereby minimized but a high casting performance is still achieved. This purpose is attained with the characteristics of claim 1.

According to this, the pumps of the storage tanks are connected to at least one synchronous dosing mechanism by pipelines blockable with valves (11, 14, 20, 26), which mechanism consists of at least two dosing chambers in which mechanically connected dosing pistons are guided. The synchronous dosing mechanism is in addition connected to at least one casting port by pipelines blockable with valves (23, 27, 30) through at least one flow mixer.

The device of the invention has the advantage that with it quickly hardening casting masses can be readied, the individual components of which are dosed with mixing ratios which must be exactly maintained. The active casting mass is left with only a very small volume.

A ready mixed casting mass is immediately filled from the flow mixer into at least one mold. Due to the direct vicinity of the casting ports of the flow mixers to the place at which the mixing of the different components occurs, it is achieved that the casting mass is filled into the mold prior to the reaction process having progressed so far that hardened casting mass can settle on any structural part of the device. The synchronous dosing mechanism produces by means of mechanically connected dosing pistons the individual components with precisely maintained mixing ratios. The individual components flow together with constant volume parts due to the synchronous piston movements. With this it is achieved that the casting mass is homogeneous. Thus a high production rate can be achieved with the device of the invention.

Further advantageous embodiments of the invention are described in claims 2 to 15.

If the dosing pistons are rigidly connected by a beam, a coordinated lifting movement of the dosing pistons can be achieved using a structural part which is relatively simple to manufacture. This coordination is further improved when the beam is guided.

A particularly space-saving construction is achieved when at least two dosing pistons are rigidly connected by a coaxially extending piston rod, which pistons are designed advantageously double-acting.

With a separate drive on the synchronous dosing mechanism, it is achieved that the piston movements can occur independently from other functions of the device. A pneumatic cylinder is thereby suitable as an inexpensive drive.

If the pumps are connected to the cavities of the dosing chambers by valves, then piston movements can be controlled through the pump operation. Individual dosing chambers can thereby be filled or emptied.

To provide a differential cylinder as a synchronous dosing mechanism has the advantage that the equipment expense for the synchronous dosing mechanism is very low. A volume and stroke boundary in the differential cylinder can thereby be realized simply and inexpensively with a stop axially inserted into the differential cylinder, which stop can be a threaded pin.

A reliable monitoring of the device is achieved when a device for detecting individual stroke magnitudes is provided on the synchronous dosing mechanism. Depending on whether or not the device is connected to a separate drive, it is advantageous to connect the device for detecting individual stroke magnitudes to the drive and/or the pumps.

The invention will be described in greater detail hereinafter in connection with the figures illustrating exemplary embodiments.

Figure 2:
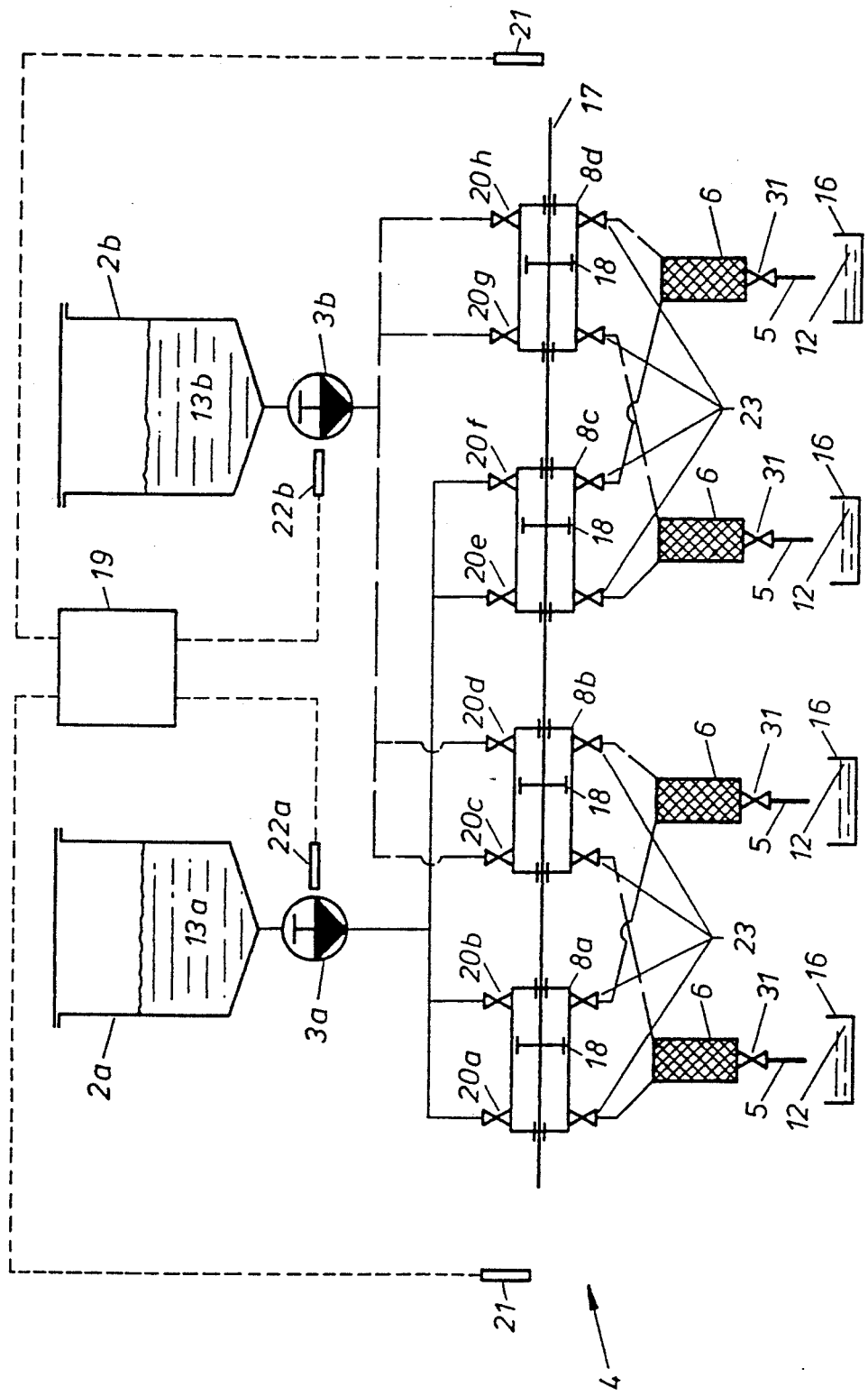
Figure 3:
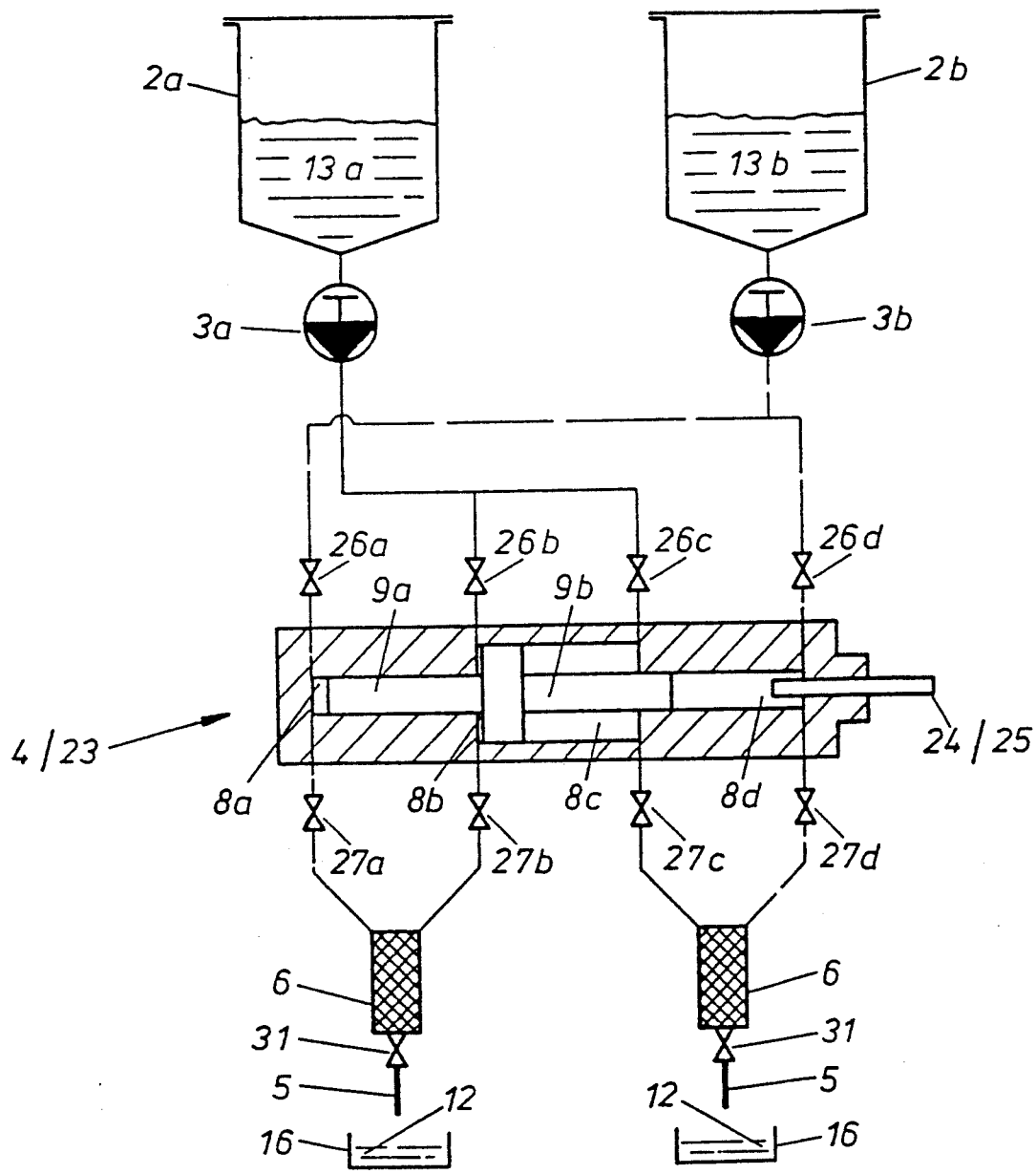
Figure 4:
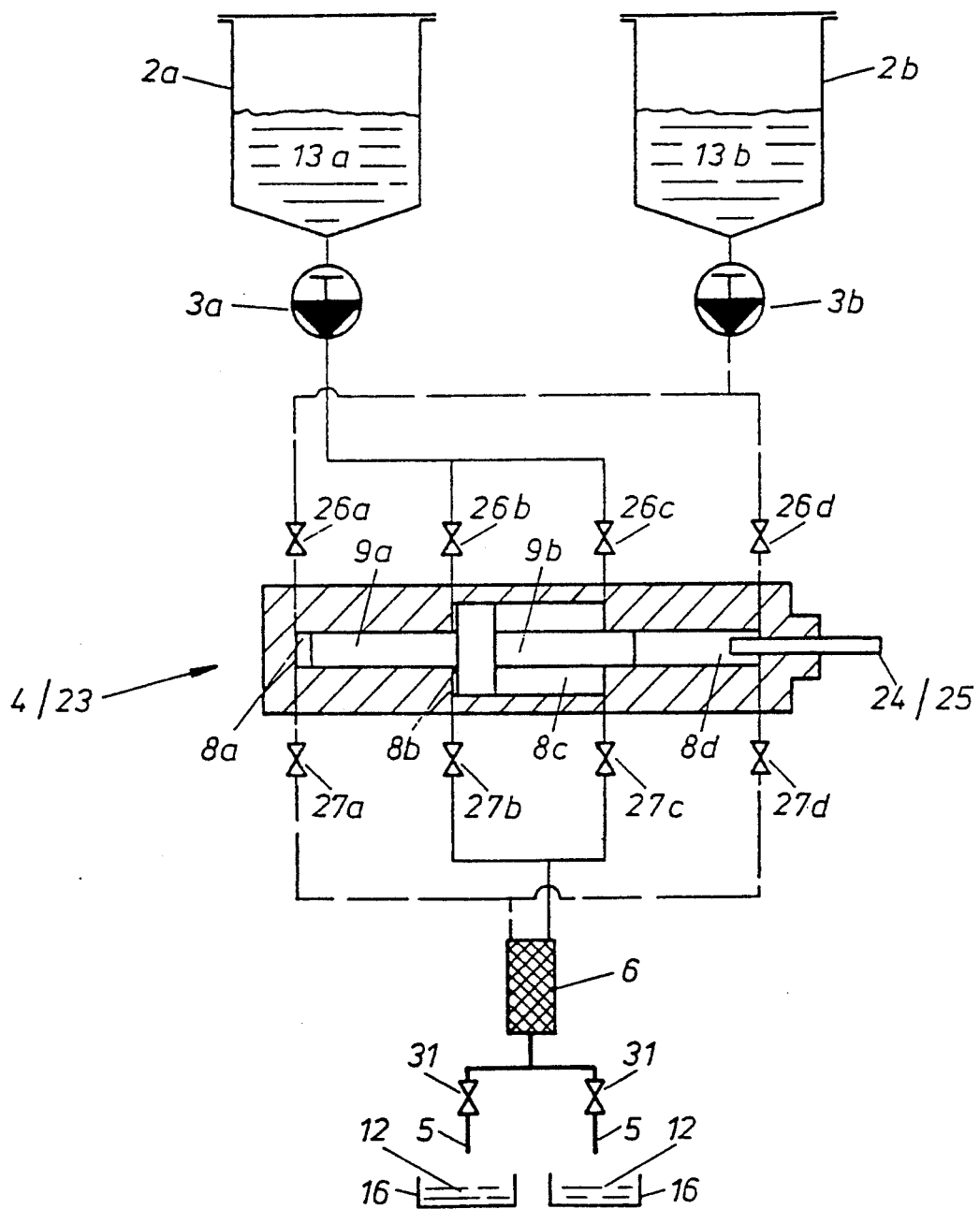

FIG. 1 schematically illustrates a device with two storage tanks, two pumps, a synchronous dosing mechanism consisting of four dosing chambers and provided with dosing pistons connected by a beam and moved by means of a drive, which synchronous dosing mechanism emits individual components for the casting mass through two flow mixers into two molds;

FIG. 2 schematically illustrates a device in which two dosing pistons are each rigidly connected with one another by an axially extending piston rod and on which a device for detecting individual stroke magnitudes is connected both to the pumps and also to the synchronous dosing mechanism, FIG. 3 schematically illustrates a device, the synchronous dosing mechanism of which is a differential cylinder, and FIG. 4 illustrates a device corresponding to FIG. 3, however, only with one flow mixer.

The device consists of two storage tanks 2a, 2b for the individual components of the casting mass, a pump 3a, 3b mounted on each storage tank 2a, 2b, a synchronous dosing mechanism 4 and two flow mixers 6 supplying two casting ports 5 (FIG. 1). The synchronous dosing mechanism 4 is essentially built out of four dosing pistons 9 rigidly connected to one another by a beam 7 and moved in dosing chambers 8a, 8b, 8c, 8d. The beam 7 is moved by means of a drive 10. The drive 10 is a pneumatic cylinder. To produce a casting mass 12, the individual components 13a, 13b are moved into the dosing chambers 8a, 8b, 8c, 8d by the pumps 3a, 3b. The pump 3a fills thereby the chambers 8a, 8d through the valves 14 and the pump 3b fills the chambers 8b, 8c through the valves 11. The dosing pistons 9 are during this filling operation moved into their uppermost position. The drive 10 is subsequently turned on and the dosing chambers 8a, 8b, 8c, 8d are evenly at least partially emptied. This even emptying is additionally supported by the beam 7 being guided in guideways 15. Each of the two individual components 13a, 13b move thus into a flow mixer 6 and from there through a casting port 5 into a mold 16.

The synchronous dosing mechanism 4 (FIG. 2) is in a further exemplary embodiment composed of four dosing chambers 8a, 8b, 8c, 8d, in which all four connected dosing pistons 18 are moved by a coaxially extending piston rod 17. A device 19 for detecting individual stroke magnitudes is connected both to the pumps 3a, 3b and also to the free ends of the piston rods 17. Sensors 21 of the device 19 detect the position of the piston rod 17. The sensors 22a, 22b determine the capacity of the pumps 3a, 3b. The pump 3a supplies the dosing chambers 8a, 8c with the individual component 13a, the pump 3b supplies the dosing chambers 8b, 8d with the individual component 13b. The valves 20a, 20c, 20e, 20g are closed for this purpose and the valves 20b, 20d, 20f, 20h are open. The piston rod 17 is moved to the left. The movement of the piston rod 17 is monitored by the sensor 21. After the simultaneous opening of the valves 20a, 20c, 20e, 20g and closing of the valves 20b, 20d, 20f, 20h, the dosing chambers 8a, 8b, 8c, 8d are now each filled with an individual component 13a by the pumps 3a, 3b, and the earlier filled dosing chambers are emptied by switching the valves 23. The piston rod is thereby moved to the right. Each of the two individual components thus move as a casting mass 12 through the flow mixers into the molds 16 during a piston rod movement.

FIG. 3 illustrates a device in which a differential cylinder 23 is provided as the synchronous dosing mechanism 4. An adjustable stop 24 designed as a thread bolt 24 is screwed axially into the differential cylinder 23 for limiting the volume and stroke in the differential cylinder 23. The pumps 3a, 3b move, when the valves 26c, 26d are open, individual components 13a, 13b into the dosing chambers 8c, 8d. The valves 26a, 26b are thereby closed and the valves 27a and 27b are open, and the rigidly connected dosing pistons 9a, 9b are moved to the left. The valves 26a, 26b and 27c and 27d are subsequently opened and the valves 26c, 26d are closed. This causes the dosing pistons 9a, 9b to move to the right and to press the individual components 13a, 13b through the valves 27c, 27d and the flow mixer 6 into a mold 16. The valves 27a, 27b are thereby closed. The casting port 5 is advantageously closed by a valve 31, thus preventing an afterflow. The flow mixer 6 is according to FIG. 4 connected to all dosing chambers 8, with the dosing chamber 8c being connected below the valve 27b and the dosing chamber 8d below the valve 27a to the statics mixer 6. The valves 27a, 27c and 27b, 27d are alternately opened and closed. The flow mixer 6 has two alternately opened and closed. The flow mixer 6 molds 16 and 16' are alternately filled. The advantage of this arrangement is that the same amount can be moved out with only one statics mixer. The portions of the individual components 13a, 13b are determined by the stroke path of the dosing piston 9b to the threaded pin 24. During the subsequent movement of the dosing pistons 9a, 9b to the left, the valves 27a, 27b are open and the valves 27c, 27d are closed. Thus the individual components 13a, 13b are pressed out of the dosing chambers 8a, 8c and out of the differential cylinder 23.

We claim:

1. A device for filling one or more molds with flowable materials, with individual components being stored in storage tanks, and a pump being provided on each of the storage tanks, characterized in that the pumps (3a, 3b) are connected to at least one synchronous dosing mechanism (4) through pipelines blockable with valves (11, 14, 20, 26), which mechanism consists of at least two dosing chambers (8a–8d), in which mechanically connected dosing pistons (9, 9a, 9b, 18) are guided, and that the synchronous dosing mechanism (4) is connected to at least one casting port (5) through pipelines blockable by valves (23, 27, 30) through at least one flow mixer (6).

2. The device according to claim 1, characterized in that the dosing pistons (9) are rigidly connected with one another by a beam (7).

3. The device according to claim 2, characterized in that the beam (7) is guided in at least one guideway (15).

4. The device according to claim 1, characterized in that at least two dosing pistons (18) are rigidly connected with one another by one coaxially extending piston rod (17).

5. The device according to claim 4, characterized in that the dosing pistons (18) are constructed as double-acting pistons.

6. The device according to claim 1, characterized in that a separate drive (10) is provided on the synchronous dosing mechanism (4).

7. The device according to claim 6, characterized in that the drive (10) is a pneumatic cylinder (11).

8. The device according to claim 1, characterized in that the synchronous dosing mechanism (4) is a differential cylinder (23).

9. The device according to claim 8, characterized in that at least one adjustable stop (25) is axially inserted into the differential cylinder (23).

10. The device according to claim 9, characterized in that the adjustable stop (25) is a thread bolt (24).

11. The device according to claim 1, characterized in that a device (19) for detecting individual stroke magnitudes is provided on the synchronous dosing mechanism (4).

12. The device according to claim 2, characterized in that the device (19) for detecting individual stroke magnitudes engages on the beam (7).

13. The device according to claim 12, characterized in that the device (19) for detecting individual stroke magnitudes is connected to the pumps (3a, 3b).

14. The device according to claim 1, characterized in that two synchronous dosing mechanisms (4) with a number of dosing chambers (8a–8d) each corresponding with the number of components are connected to a statics mixer (6) through pipelines provided with valves (30, 23, 27).

* * * * *

UNITED STATES PATENT AND TRADEMARK OFFICE
CERTIFICATE OF CORRECTION

PATENT NO. :   5 217 146

DATED      :   June 8, 1993

INVENTOR(S) :  Gerd NEFF et al.

It is certified that error appears in the above-identified patent and that said Letters Patent is hereby corrected as shown below:

On the title page, in column 1, item [73]:
    change "Vakumanlagen" to ---Vakuumanlagen---.

Signed and Sealed this

Eighth Day of March, 1994

Attest:

BRUCE LEHMAN

Attesting Officer     Commissioner of Patents and Trademarks